(12) United States Patent
Kim (10) Patent No.: US 11,945,283 B2
(45) Date of Patent: Apr. 2, 2024

(54) THERMAL MANAGEMENT SYSTEM OF GAS INJECTION TYPE FOR VEHICLE

(71) Applicants: HYUNDAI MOTOR COMPANY, Seoul (KR); KIA CORPORATION, Seoul (KR)

(72) Inventor: Jong Won Kim, Cheonan-si (KR)

( * ) Notice: Subject to any disclaimer, the term of this patent is extended or adjusted under 35 U.S.C. 154(b) by 0 days.

(21) Appl. No.: 17/978,154

(22) Filed: Oct. 31, 2022

(65) Prior Publication Data

US 2023/0331065 A1 Oct. 19, 2023

(30) Foreign Application Priority Data

Apr. 15, 2022 (KR) .................. 10-2022-0046755

(51) Int. Cl.
*B60H 1/32* (2006.01)

(52) U.S. Cl.
CPC .......... *B60H 1/3213* (2013.01); *B60H 1/3227* (2013.01); *B60H 1/3228* (2019.05); *B60H 2001/3267* (2013.01); *B60H 2001/3298* (2013.01)

(58) Field of Classification Search
CPC .. B60H 1/3213; B60H 1/3227; B60H 1/3228; B60H 2001/3267; F25B 2400/0403; F25B 2400/0409; F25B 2400/05; F25B 2400/053; F25B 2400/13; F25B 6/04; F25B 41/325
See application file for complete search history.

(56) References Cited

U.S. PATENT DOCUMENTS

| 7,779,647 | B2 | 8/2010 | Takeuchi et al. | |
|---|---|---|---|---|
| 9,200,820 | B2 | 12/2015 | Okazaki et al. | |
| 2012/0266622 | A1* | 10/2012 | Inaba | B60H 1/00899 62/186 |
| 2018/0009291 | A1* | 1/2018 | Ohishi | B60H 1/00485 |
| 2019/0283537 | A1* | 9/2019 | Yamaguchi | B60H 1/00807 |
| 2022/0082308 | A1* | 3/2022 | Yamaguchi | F25B 41/42 |
| 2022/0268503 | A1* | 8/2022 | Yoshimi | F25B 49/02 |
| 2022/0275983 | A1* | 9/2022 | Kawano | F25B 41/20 |

FOREIGN PATENT DOCUMENTS

| JP | 2006-258343 A | 9/2006 |
|---|---|---|
| JP | 2013-001268 A | 1/2013 |
| JP | 2013-015264 A | 1/2013 |
| KR | 10-2006-0057963 | 5/2006 |
| KR | 10-1503012 B1 | 3/2015 |
| KR | 10-2103358 B1 | 4/2020 |
| KR | 10-2021-0026705 A | 3/2021 |

* cited by examiner

*Primary Examiner* — Marc E Norman
(74) *Attorney, Agent, or Firm* — MCDONNELL BOEHNEN HULBERT & BERGHOFF LLP (57) ABSTRACT

The present disclosure relates to a thermal management system of gas injection type for a vehicle and, more particularly, to a thermal management system of gas injection type for a vehicle, which can implement various types of heating and cooling modes according to vehicle operating conditions and improve heating efficiency by increasing the flow rate of circulating refrigerant.

17 Claims, 10 Drawing Sheets

THERMAL MANAGEMENT SYSTEM OF GAS INJECTION TYPE FOR VEHICLE

CROSS REFERENCE TO RELATED APPLICATION

The present application claims priority to Korean Patent Application No. 10-2022-0046755, filed Apr. 15, 2022, the entire contents of which is incorporated herein for all purposes by this reference.

BACKGROUND

Field

The present disclosure relates to a thermal management system of gas injection type for a vehicle and, more particularly, to a thermal management system of gas injection type for a vehicle, which can implement various types of heating and cooling modes according to vehicle operating conditions and improve heating efficiency by increasing the flow rate of circulating refrigerant.

Description of the Related Art

Recently, due to environmental issues with internal combustion engine vehicles, electric vehicles are increasing in popularity as an eco-friendly option. However, unlike conventional internal combustion engine vehicles which do not require additional energy for heating since the waste heat from the engine can be used to warm up the cabin, the electric vehicles, which have no engine and thus no heat source, require energy to heat the cabin, which leads to a decrease in energy efficiency. This shortens the driving range of electric vehicles, causing inconveniences such as the need for frequent charging.

Meanwhile, recently, research on heating using a heat pump system is being actively conducted in order to improve heating efficiency in electric vehicles. One of the methods to increase the efficiency of a heat pump system is to use a gas injection type heat pump. The gas injection type heat pump improves heating efficiency of a vehicle by increasing the flow rate of refrigerant circulated to a compressor during heating using a heat exchanger (HX) or a flash tank.

Yet, since the conventional gas injection type heat pump is determined as a heating circuit according to either one of a heat exchanger or a flash tank, there is a problem in that it is difficult to selectively implement heating or cooling according to vehicle operating conditions, and the efficiency is not high.

The content described as the related art above is only for understanding the background of the present disclosure, and should not be taken as an acknowledgment that it corresponds to the prior art known to those of ordinary skill in the art.

SUMMARY

Accordingly, the present disclosure has been made keeping in mind the above problems occurring in the related art, and the present disclosure is intended to provide a thermal management system of gas injection type for a vehicle, which can implement various types of heating and cooling modes according to vehicle operating conditions and increase heating efficiency by increasing the flow rate of refrigerant circulating to a compressor.

In order to achieve the above objective, according to an embodiment of the present disclosure, there is provided a thermal management system of gas injection type for a vehicle, the system including a main refrigerant line in which a compressor, an inner condenser, a first expansion valve, an air condenser, a second expansion valve, and an evaporator are provided to circulate a refrigerant, an integrated heat exchanger that is provided between the inner condenser and the air condenser on the main refrigerant line, and allows heat exchange between a portion of refrigerant discharged from the compressor or the inner condenser and refrigerant which is an expanded version of the remaining refrigerant, a gas injection refrigerant line branched from a rear end of the compressor or the inner condenser, and in which branched refrigerant passes through a third expansion valve and then is bypassed to the compressor through the integrated heat exchanger, and a controller that controls whether the compressor operates or not, and, by adjusting opening degrees of the first expansion valve, the second expansion valve, and the third expansion valve, controls whether the refrigerant flows or not and whether the refrigerant expands or not.

Between the compressor and the inner condenser, a first branch line may be provided in which the refrigerant discharged from the compressor joins, after bypassing the inner condenser, the refrigerant that has passed through the inner condenser, the gas injection refrigerant line may be branched from the rear end of a point where the first branch line joins the main refrigerant line, a second branch line, in which the refrigerant expanded in the third expansion valve joins the refrigerant that has bypassed the third expansion valve, may be provided at the rear end of the third expansion valve of the gas injection refrigerant line, and the integrated heat exchanger may be provided with a third branch line that allows a gaseous refrigerant to be joined at a front end of the compressor of the gas injection refrigerant line.

In the integrated heat exchanger, heat exchange may take place between a liquid refrigerant that is part of the refrigerant discharged from the compressor or inner condenser, and a gaseous refrigerant expanded in the third expansion valve, and the heat-exchanged gaseous refrigerant may be separated and bypassed to the compressor.

In a general heat pump mode, the controller may circulate the refrigerant only through the main refrigerant line, and allow heat absorbed from outside air in the air condenser and heat generated when the refrigerant is compressed in the compressor to be dissipated in the inner condenser to indoor air.

In the general heat pump mode, the controller may operate the compressor so that the compressed refrigerant passes through the inner condenser and exchanges heat with the indoor air of a vehicle to dissipate heat, and adjust the opening degree of the first expansion valve, so that the refrigerant heat-dissipated through the inner condenser expands while passing through the first expansion valve and exchanges heat with the outside air to absorb heat while passing through the air condenser.

In the general heat pump mode, the controller may fully open the second expansion valve and fully close the third expansion valve.

In a general cooling mode, the controller may circulate the refrigerant to the main refrigerant line while allowing the refrigerant compressed in the compressor to flow to a first branch line to bypass the inner condenser, and ensure that heat absorbed in the evaporator for indoor cooling and heat generated when the refrigerant is compressed in the compressor are dissipated in the air condenser.

In the general cooling mode, the controller may operate the compressor so that the compressed refrigerant passes through the air condenser and exchanges heat with outside air to dissipate heat, and adjust the opening degree of the second expansion valve, so that the refrigerant condensed while passing through the air condenser expands while passing through the second expansion valve and exchanges heat with the outside air flowing into a vehicle to absorb heat while passing through the evaporator.

In the general cooling mode, the controller may fully open the first expansion valve and fully close the third expansion valve.

In a first gas injection heat pump mode, the controller may circulate the refrigerant to the main refrigerant line and the gas injection refrigerant line, but ensure a portion of the refrigerant that has passed through the inner condenser is subcooled in the integrated heat exchanger before circulating, while the remaining refrigerant expands and then is heat exchanged in the integrated heat exchanger before circulating to the compressor, and allow heat absorbed from outside air in the air condenser and heat generated when the refrigerant is compressed in the compressor to be dissipated in the inner condenser to indoor air.

In the first gas injection heat pump mode, the controller may operate the compressor so that the compressed refrigerant passes through the inner condenser and exchanges heat with indoor air of a vehicle to dissipate heat, adjust an opening degree of the third expansion valve so that a portion of the refrigerant heat-dissipated through the inner condenser is subcooled while exchanging heat in the integrated heat exchanger, and the remaining refrigerant expands while passing through the third expansion valve and then exchanges heat to absorb heat in the integrated heat exchanger, and adjust an opening degree of the first expansion valve so that the subcooled refrigerant in the integrated heat exchanger expands while passing through the first expansion valve and exchanges heat with the outside air to absorb heat while passing through the air condenser.

In the first gas injection heat pump mode, the controller may fully open the second expansion valve.

In a COP=1 heating mode, the controller may circulate the refrigerant to the gas injection refrigerant line, but ensure a portion of the refrigerant that has passed through the inner condenser bypasses to the integrated heat exchanger, while the remaining refrigerant expands and then absorbs heat in the integrated heat exchanger before circulating to the compressor, and allow heat absorbed through heat exchange in the integrated heat exchanger and heat generated when the refrigerant is compressed in the compressor to be dissipated in the inner condenser to indoor air.

In the COP=1 heating mode, the controller may operate the compressor so that the compressed refrigerant passes through the inner condenser and exchanges heat with indoor air of a vehicle to dissipate heat, adjust an opening degree of the third expansion valve so that a portion of the refrigerant heat-dissipated through the inner condenser is heat-dissipated while exchanging heat in the integrated heat exchanger, and the remaining refrigerant expands while passing through the third expansion valve and then exchanges heat to absorb heat in the integrated heat exchanger.

In the COP=1 heating mode, the controller may fully close the first expansion valve and the second expansion valve.

In a second gas injection heat pump mode, the controller may circulate the refrigerant to the main refrigerant line and the gas injection refrigerant line, but ensure a portion of the refrigerant that has passed through the inner condenser expands and joins the remaining refrigerant, while ensuring the refrigerant is subcooled in the integrated heat exchanger before circulating a portion of the refrigerant to the compressor and the remaining refrigerant to the air condenser, and allow heat absorbed from outside air in the air condenser and heat generated when the refrigerant is compressed in the compressor to be dissipated in the inner condenser to indoor air.

In the second gas injection heat pump mode, the controller may operate the compressor so that the compressed refrigerant passes through the inner condenser and exchanges heat with indoor air of a vehicle to dissipate heat, adjust an opening degree of the third expansion valve so that a portion of the refrigerant heat-dissipated through the inner condenser expands while passing through the third expansion valve and joins the remaining refrigerant, before the refrigerant is subcooled in the integrated heat exchanger, and adjust an opening degree of the first expansion valve so that the refrigerant subcooled in the integrated heat exchanger expands while passing through the first expansion valve and exchanges heat with the outside air to absorb heat while passing through the air condenser.

In the second gas injection heat pump mode, the controller may fully close the second expansion valve.

According to embodiments of the present disclosure, by implementing various states of refrigerant flowing into an integrated heat exchanger and allowing heat exchange to take place, it is possible to implement various types of heating and cooling modes according to the ambient environment and operating conditions.

Furthermore, by implementing a gas injection type heat pump method, it is possible to increase the flow rate of the refrigerant circulated in the refrigerant line, and accordingly, the effect of improving heating efficiency can be expected.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, embodiments of the present disclosure will be described in detail with reference to the accompanying drawings. However, the present disclosure is not limited to the embodiments disclosed below, but will be implemented in various different forms, and the embodiments are provided only so that the disclosure of the present disclosure is complete, and to fully inform those of ordinary skill in the scope of the disclosure. In the drawings, the same reference numerals refer to the same elements.

Figure 1:
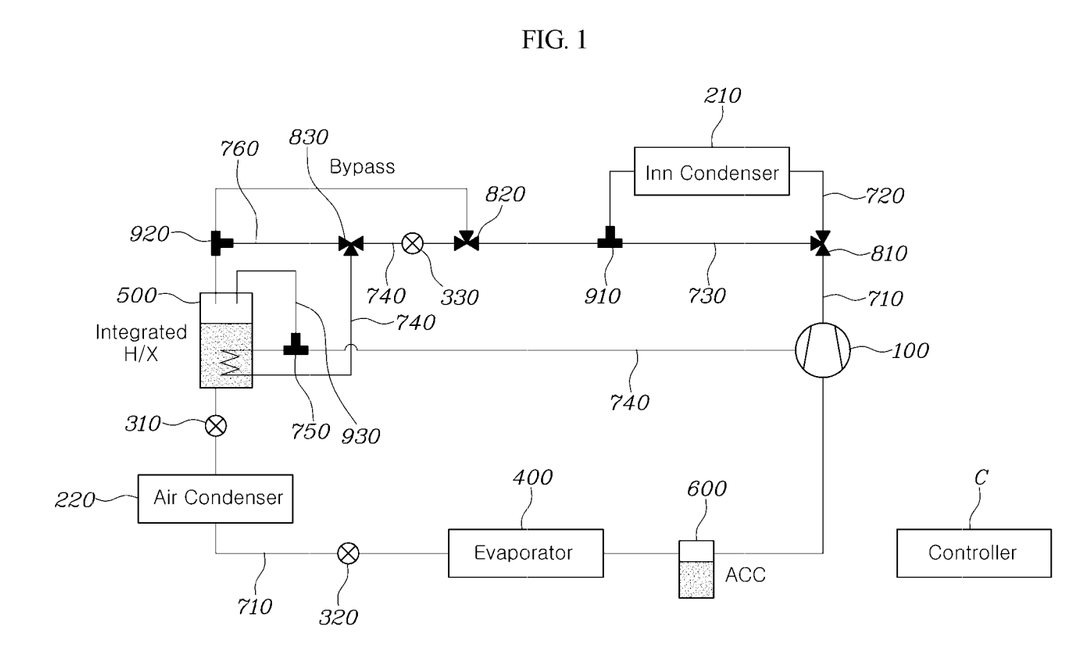
FIG. 1 is a circuit diagram showing a thermal management system of gas injection type for a vehicle according to an embodiment of the present disclosure.

FIG. 1 is a circuit diagram showing a thermal management system of gas injection type for a vehicle according to an embodiment of the present disclosure.

As shown in FIG. 1, a thermal management system of gas injection type for a vehicle according to an embodiment of the present disclosure includes a main refrigerant line 710 in which a compressor 100, an inner condenser 210, a first expansion valve 310, an air condenser 220, a second expansion valve 320, an evaporator 400, and a accumulator 600 are sequentially provided to circulate a refrigerant.

The compressor 100 is a means for compressing the refrigerant circulated in the main refrigerant line 710 to convert the refrigerant into a high pressure one. In this case, the compressor 100 is a gas injection type compressor which corresponds to a typical compressor having a structure in which refrigerant is introduced through a refrigerant inlet, compressed inside, and the compressed refrigerant is discharged through an outlet, and additional refrigerant is introduced through a separate secondary inlet. Since many gas injection type compressors have been introduced in the related art, a detailed description thereof will be omitted.

The inner condenser 210, which is installed in the heating and cooling unit inside a vehicle, is a means for vehicle heating. The inner condenser 210 ensures the refrigerant dissipates heat while allowing heat exchange between the compressed refrigerant passing through the inner condenser 210 and the air supplied to the vehicle cabin, and through this, the temperature of the indoor air increases.

The air condenser 220, which is installed outside the vehicle cabin, is a means for effecting heat exchange between the refrigerant flowing through the air condenser 220 and the outside air. The air condenser 220 serves to increase the temperature of the refrigerant by allowing to absorb heat from the outside air in heating mode, and serves as a condenser for cooling and condensing the refrigerant by dissipating heat of the refrigerant to the outside air in cooling mode.

The evaporator 400, which is installed in the heating and cooling unit inside a vehicle, is a means for effecting heat exchange between the refrigerant and the indoor air. The evaporator 400 serves to cool the indoor air by allowing the refrigerant to absorb heat from the indoor air, thereby cooling the cabin.

The accumulator 600 serves to separate the gaseous refrigerant and the liquid refrigerant contained in refrigerant, and supply only the gaseous refrigerant to the compressor.

In addition, on the main refrigerant line 710, between the inner condenser 210 and the air condenser 220, preferably between the inner condenser 210 and the first expansion valve 310, an integrated heat exchanger 500 for effecting heat exchange between the refrigerants in different states is provided.

For refrigerant flowing into the integrated heat exchanger 500, a portion of the refrigerant discharged from the compressor 100 or the inner condenser 210, and the refrigerant which is an expanded version of the remaining refrigerant are all introduced.

In further detail, in the integrated heat exchanger 500, heat exchange takes place between the liquid refrigerant which is a liquefied version of a portion of the refrigerant discharged from the compressor 100 or the inner condenser 210 and the gaseous refrigerant expanded in the third expansion valve 330, and the heat-exchanged gaseous refrigerant is separated and supplied to the compressor 100. That is, the integrated heat exchanger 500 may be viewed as a mixture of a heat exchanger type and a flash type gas injection systems.

In the present disclosure, additionally provided is a gas injection refrigerant line 740 that allows a portion of the refrigerant discharged from the inner condenser 210 to expand and flow into the integrated heat exchanger 500, and allows the refrigerant that has passed through the integrated heat exchanger 500 to bypass to the compressor 100.

The main refrigerant line 710 and the gas injection refrigerant line 740 are integrated and implemented, and a first branch line 730, in which the refrigerant discharged from the compressor 100 bypasses the inner condenser 210 and then joins the refrigerant that has passed through the inner condenser 210, is provided between the compressor 100 and the inner condenser 210 in order to implement an indoor cooling mode.

In addition, a first three-way valve 810 is provided at an upstream point of the first branch line 730 from which the first branch line 730 is branched from the main refrigerant line 710, and according to the control of the first three-way valve 810 by a controller C, the refrigerant flows to the inner condenser 210 or the inner condenser 210 is bypassed.

Meanwhile, the controller according to an exemplary embodiment of the present disclosure may be implemented as an algorithm configured to control the behavior of various components of a vehicle, or a non-volatile memory (not shown) configured to store data pertaining to software instructions for reproducing the algorithm, and a processor (not shown) configured to perform the operations described below using data stored in the memory. Here, the memory and the processor may be implemented as separate chips. Alternatively, the memory and the processor may be implemented as a single chip integrated with each other. The processor may take the form of one or more processors.

A first branch point 910 at which the main refrigerant line 710 and the first branch line 730 join is formed at a downstream point of the first branch line 730.

In addition, the gas injection refrigerant line 740 is branched at a point downstream of the point where the first branch line 730 joins the main refrigerant line 710, and a second branch line 760 for allowing the refrigerant expanded in the third expansion valve 330 to join the main refrigerant line is provided downstream of the third expansion valve 330 of the gas injection refrigerant line 740.

At this time, a second three-way valve 820 is provided upstream of the gas injection refrigerant line 740, and according to the control of the second three-way valve 820 by the controller C, the refrigerant is bypassed the integrated heat exchanger 500 or flows to the gas injection refrigerant line 740.

On the downstream side of the third expansion valve 330 on the gas injection refrigerant line 740, a third three-way valve 830 is provided at a point where the second branch line 760 is branched, and according to the control of the third three-way valve 830, the refrigerant that has passed through the third expansion valve 330 is introduced into the integrated heat exchanger through the second branch line 760 or into the integrated heat exchanger 500 through the gas injection refrigerant line.

To this end, a downstream point of the second branch line 760 is connected to a second branch point 920 that joins the main refrigerant line 710.

The integrated heat exchanger 500 is provided with a third branch line 750 for allowing the gaseous refrigerant to join upstream of the compressor 100 of the gas injection refrigerant line 740.

The upstream point of the third branch line 750 is connected to the integrated heat exchanger 500, and the downstream point of the third branch line 750 joins the gas injection refrigerant line 740 that has passed through the integrated heat exchanger 500.

To this end, the downstream of the third branch line 750 joins the gas injection refrigerant line 740 and a third branch point 930.

In addition, in the present disclosure, provided is the controller C that controls whether the compressor 100 operates or not, and controls whether the refrigerant flows or not and whether the refrigerant expands or not by adjusting opening degrees of the first expansion valve 310, the second expansion valve 320, and the third expansion valve 330.

The thermal management system of gas injection type for a vehicle according to an embodiment of the present disclosure configured as described above may implement various modes under the control of the controller C.

Hereinafter, examples of implementation of various modes implemented in the thermal management system of gas injection type for a vehicle will be described with reference to the drawings.

Figure 2:
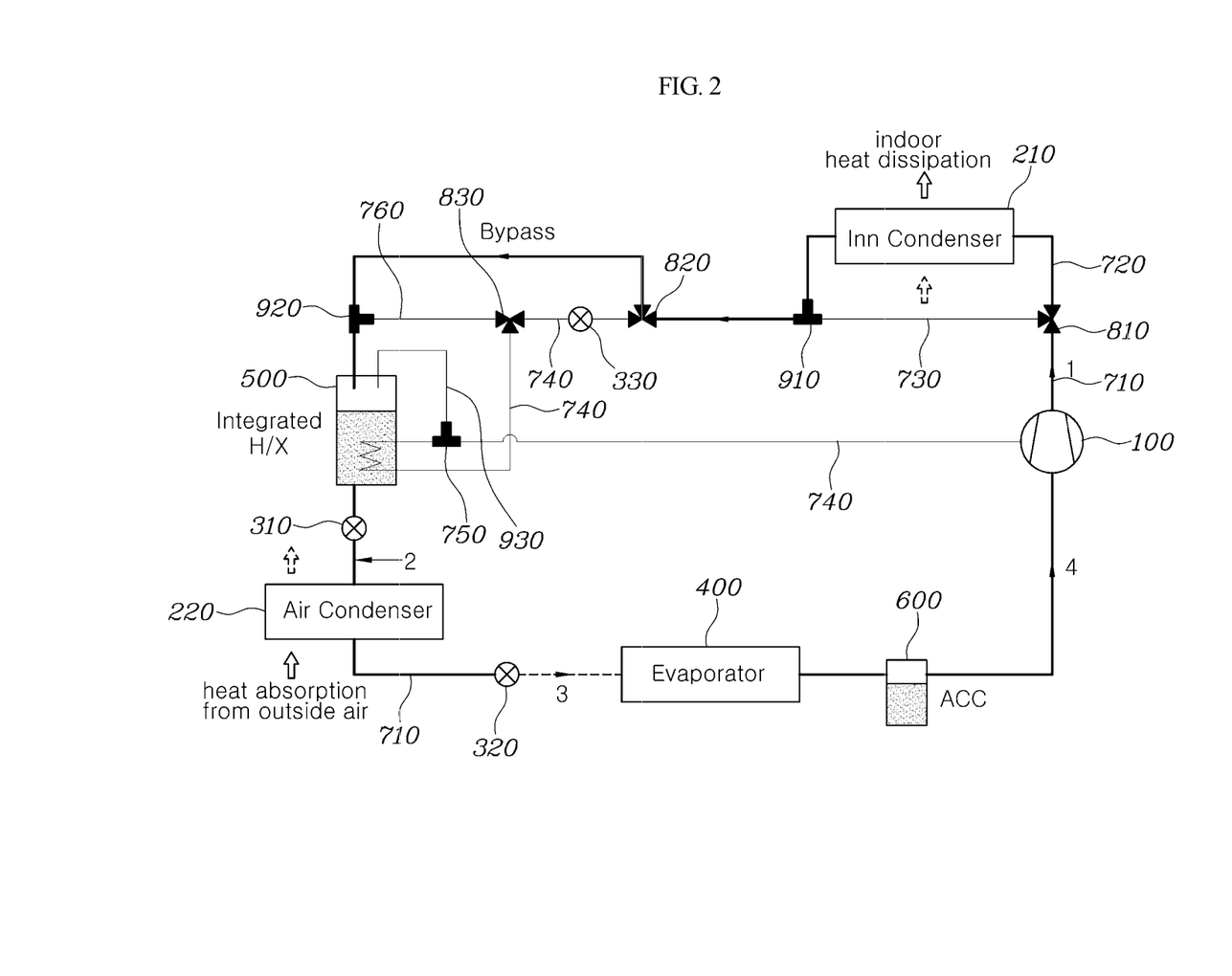
FIG. 2 is a circuit diagram showing the operation of a general heat pump mode in a thermal management system of gas injection type for a vehicle according to an embodiment of the present disclosure.
Figure 3:
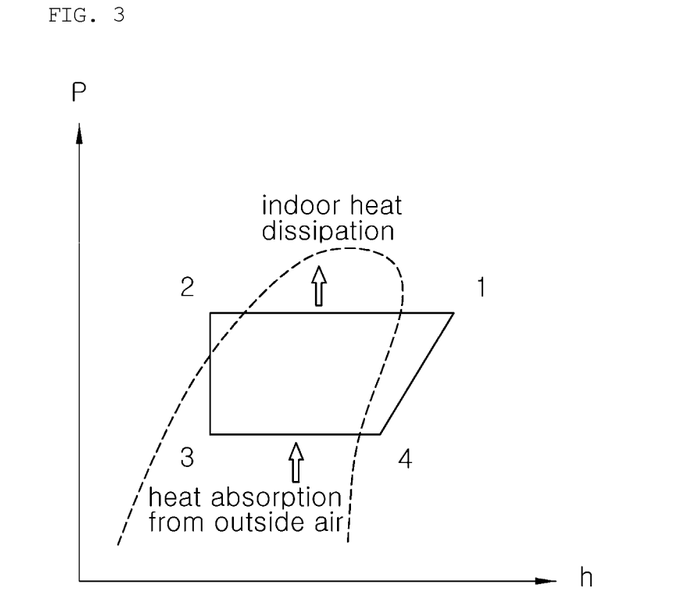
FIG. 3 is a P-h diagram showing the operation of a general heat pump mode in a thermal management system of gas injection type for a vehicle according to an embodiment of the present disclosure.

FIGS. 2 and 3 are a circuit diagram and a P-h diagram showing the operation of a general heat pump mode in a thermal management system of gas injection type for a vehicle according to an embodiment of the present disclosure.

As shown in FIGS. 2 and 3, the general heat pump mode is a general heating mode that utilizes a heat source from outside air, in which heat absorbed from outside air in the air condenser 220 and heat generated when the refrigerant is compressed in the compressor 100 are dissipated in the inner condenser 210 to the indoor air to heat the cabin.

At this time, the refrigerant is circulated only to the main refrigerant line 710.

The controller operates the compressor so that the compressed refrigerant passes through the inner condenser 210 and dissipates heat while exchanging heat with indoor air of the vehicle.

In addition, the controller adjusts the opening degree of the first expansion valve 310 to expand the refrigerant passing therethrough, so that the refrigerant absorbs heat from the outside air and evaporates in the air condenser 220. The controller controls the second expansion valve 320 to be fully opened so that the refrigerant simply passes through the evaporator without absorbing heat in the evaporator. The controller controls the third expansion valve 330 to be fully closed.

Accordingly, the refrigerant dissipated while passing through the inner condenser 210 expands while passing through the first expansion valve 310 so as to absorb heat while passing through the air condenser 220 while exchanging heat with the outside air.

The refrigerant compressed through the compressor 100 flows into the inner condenser 210 under the control of the first three-way valve 810, and is condensed while dissipating heat in the inner condenser 210 to perform indoor heating.

The refrigerant condensed in the inner condenser 210 passes through the first branch point 910 and then, under the control of the second three-way valve 820 or because the third expansion valve 330 is fully closed, all the refrigerant passes through the third expansion valve 330 and then passes through the second branch point 920 and flows into the integrated heat exchanger 500.

However, since all the refrigerant bypasses the third expansion valve 330 under the control of the second three-way valve 820, refrigerant does not flow into the gas injection refrigerant line 740, and accordingly, heat exchange does not take place in the integrated heat exchanger 500, and the liquid refrigerant of the integrated heat exchanger 500 is supplied to the first expansion valve 310.

At this time, since the opening degree of the first expansion valve 310 is controlled to expand the refrigerant, the refrigerant expands while passing through the first expansion valve 310.

The expanded refrigerant passes through the air condenser 220 and absorbs heat from the outside air. Then, the refrigerant passes through the fully opened second expansion valve 320 and the evaporator 400, and then circulates to the compressor 100 through the accumulator 600.

FIG. 3 shows a P-h diagram in such a mode, and is a graph theoretically showing a process of absorbing heat from outside air and dissipating heat to the cabin while the refrigerant circulates in order.

Figure 4:
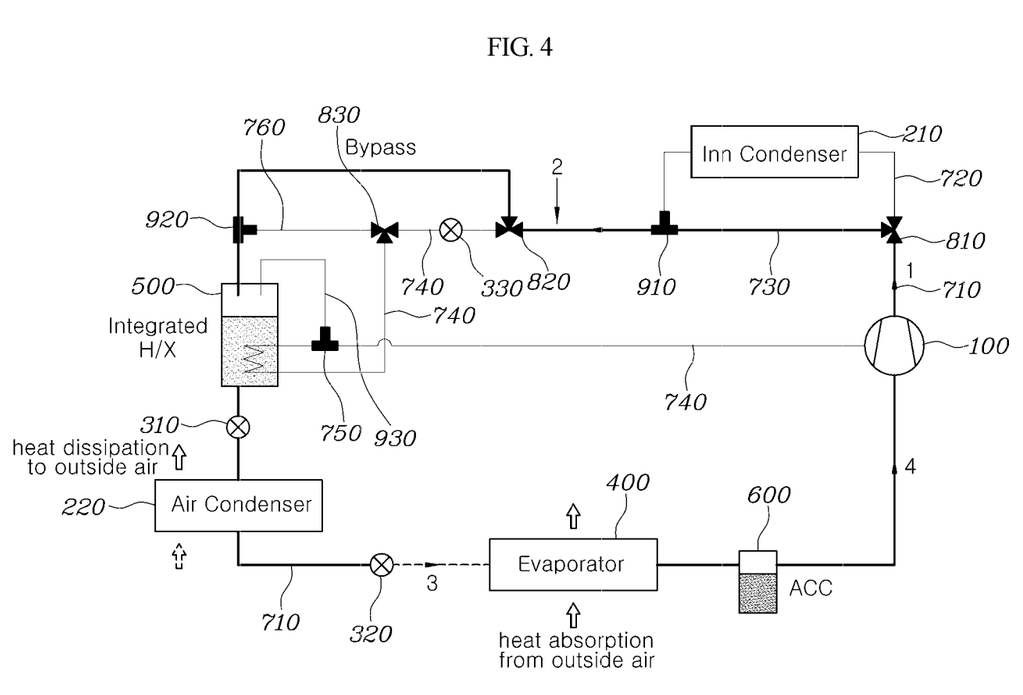
FIG. 4 is a circuit diagram showing the operation of a general cooling mode in a thermal management system of gas injection type for a vehicle according to an embodiment of the present disclosure.

Meanwhile, FIG. 4 is a circuit diagram showing the operation of a general cooling mode in a thermal management system of gas injection type for a vehicle according to an embodiment of the present disclosure.

First, the refrigerant compressed through the compressor 100 bypasses the inner condenser 210 by the first three-way valve 810. The high-temperature and high-pressure refrigerant that has bypassed the inner condenser 210 is directly introduced into the integrated heat exchanger 500 by bypassing the third expansion valve 330 through the second three-way valve 820.

By controlling the second three-way valve 820 and the third three-way valve 830 or completely closing the third expansion valve 330, refrigerant does not flow in the gas injection refrigerant line 740.

In addition, the liquid refrigerant of the integrated heat exchanger 500 flows to the air condenser 220 through the fully opened first expansion valve 310, and while passing through the air condenser 220, the heat of the refrigerant dissipates to the outside air. Accordingly, the refrigerant is condensed and the condensed refrigerant is expanded through the second expansion valve 320 and then introduced into the evaporator 400. The evaporator 400 cools the indoor air with the cooled refrigerant to cool the cabin, and the refrigerant is recovered to the compressor 100 again.

Therefore, in the case of the present disclosure, it is possible to implement a cooling mode other than heat pump heating and gas injection heating, and it is possible to cool the cabin with high efficiency that is not different from the conventional cooling circuit.

Figure 5:
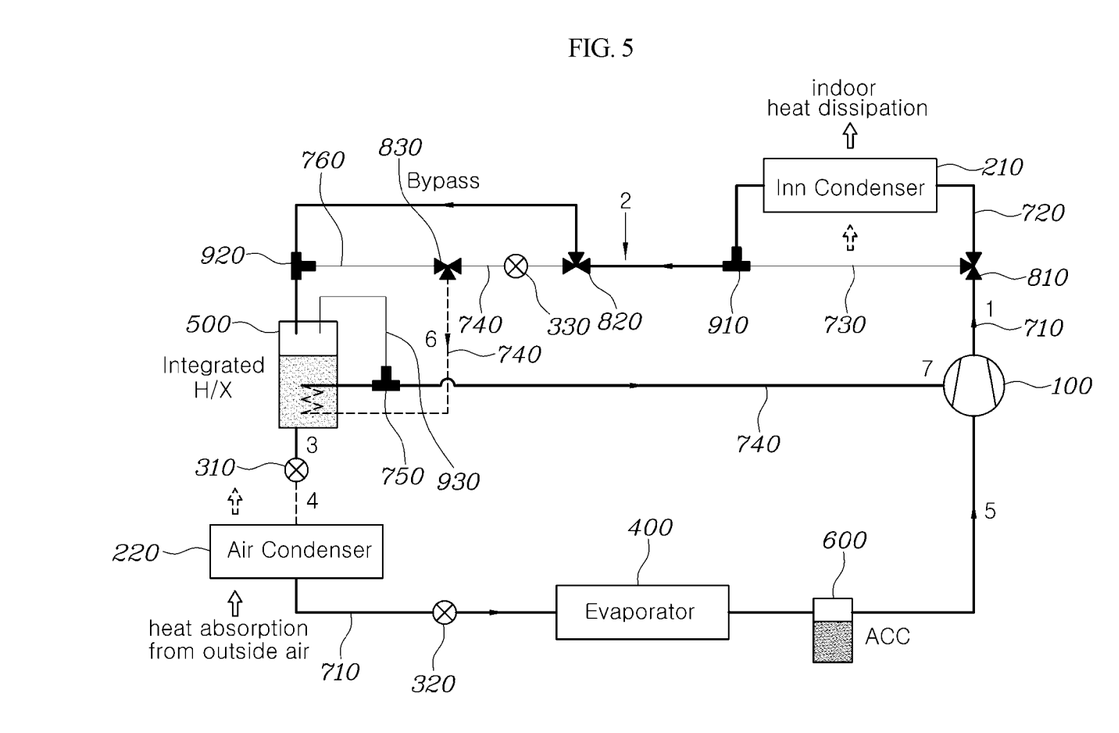
FIG. 5 is a circuit diagram showing the operation of the first gas injection heat pump mode in a thermal management system of gas injection type for a vehicle according to an embodiment of the present disclosure.
Figure 6:
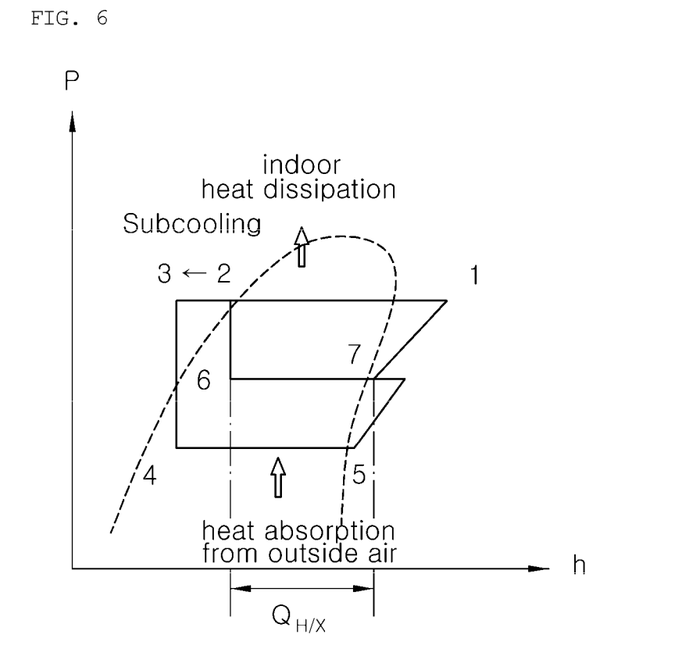
FIG. 6 is a P-h diagram showing the operation of the first gas injection heat pump mode in a thermal management system of gas injection type for a vehicle according to an embodiment of the present disclosure.

FIGS. 5 and 6 are a circuit diagram and a P-h diagram showing the operation of the first gas injection heat pump mode in a thermal management system of gas injection type for a vehicle according to an embodiment of the present disclosure.

In the first gas injection heat pump mode, the high-temperature and high-pressure refrigerant compressed by the compressor 100 is introduced into the inner condenser 210 under the control of the first three-way valve 810 to perform indoor heating. A portion of the refrigerant discharged from the inner condenser 210 bypasses the third expansion valve 330 and flows into the integrated heat exchanger 500 under the control of the second three-way valve 820, and the rest is introduced into the gas injection refrigerant line 740 under the control of the third three-way valve 830 after being expanded by the third expansion valve 330.

In the integrated heat exchanger 500, the liquid refrigerant condensed and accumulated through the inner condenser 210 and the expanded gaseous refrigerant exchange heat, and accordingly, the gaseous refrigerant of the gas injection refrigerant line 740 is provided to the compressor 100 in a state in which heat is absorbed through the integrated heat exchanger 500.

The liquid refrigerant of the integrated heat exchanger 500 is expanded through the first expansion valve 310 and flows through the air condenser 220 to absorb heat from the outside air, and then introduced into the compressor 100 after passing through the fully opened second expansion valve 320 and the evaporator 400.

Therefore, in the compressor 100, in addition to the refrigerant that has absorbed heat from the outside air, all the refrigerant that has absorbed heat through the integrated heat exchanger 500 is introduced and compressed, so that it is possible to secure a sufficient flow rate of the refrigerant required for heating, thereby maximizing the efficiency of heating with the heat pump.

In particular, in the case of the present disclosure, the integrated heat exchanger not only plays the role of a flash tank, but also plays the role of providing the gaseous refrigerant that absorbed heat through heat exchange to the compressor, thereby increasing the efficiency of the gas injection system.

FIG. 6 shows the relevant P-h diagram. As shown in FIG. 6, refrigerant performs indoor heat dissipation, and uses heat from the compressor and heat from outside air for heat absorption. In particular, by securing additional flow rate of the refrigerant in the compressor, higher heating efficiency can be achieved.

Figure 7:
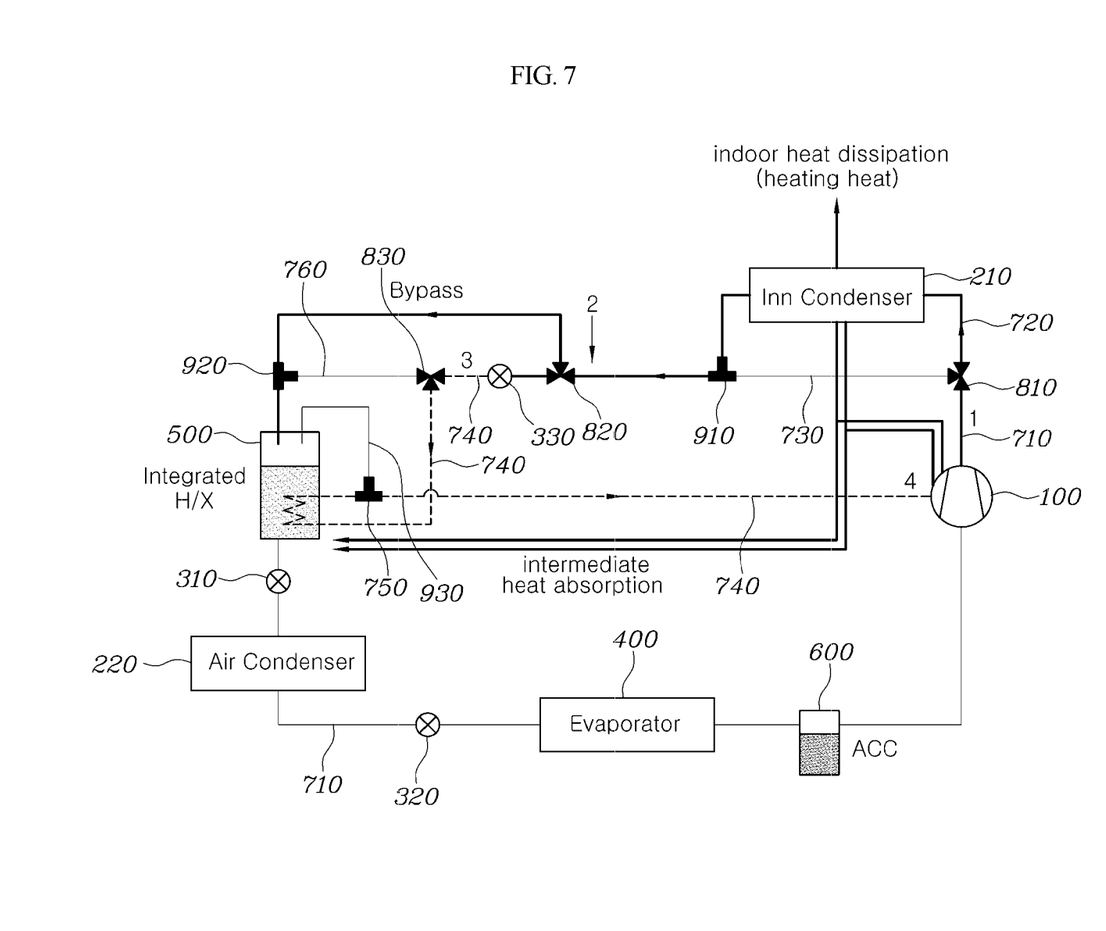
FIG. 7 is a circuit diagram showing the operation of COP=1 heating mode in a thermal management system of gas injection type for a vehicle according to an embodiment of the present disclosure.
Figure 8:
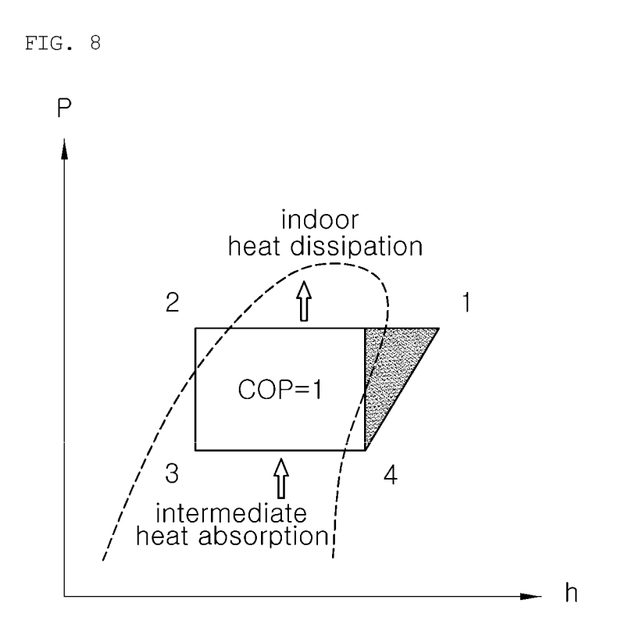
FIG. 8 is a P-h diagram showing the operation of COP=1 heating mode in a thermal management system of gas injection type for a vehicle according to an embodiment of the present disclosure.

FIGS. 7 and 8 are a circuit diagram and a P-h diagram showing the operation of COP=1 heating mode in a thermal management system of gas injection type for a vehicle according to an embodiment of the present disclosure.

In this case, indoor heat dissipation and intermediate heat absorption are performed only by the amount of heat generated in the compressor 100, and thus, representing a heating mode that theoretically achieves COP=1.

In further detail, the refrigerant compressed in the compressor 100 passes through the inner condenser 210 for heating, and the refrigerant expanded through the third expansion valve 330 is provided back to the compressor 100 through the gas injection refrigerant line 740. In this process, by completely closing the first expansion valve 310, the refrigerant is not introduced into the air condenser 220 and the evaporator 400, and all the refrigerant is provided to the compressor 100 through the gas injection refrigerant line 740.

Therefore, in this case, heating is performed only by the heat of the compressor 100 rather than external heat, and thus, low-efficiency heat transfer means such as a PTC heater can be omitted, thereby reducing the manufacturing cost of the vehicle and increasing the fuel efficiency.

As in the P-h diagram of FIG. 8, indoor heating is performed through intermediate heat absorption, and all the energy required for such intermediate heat absorption is covered only by the compressor, so that indoor heating can be performed with higher efficiency than in the case of conventional PTC heater.

Figure 9:
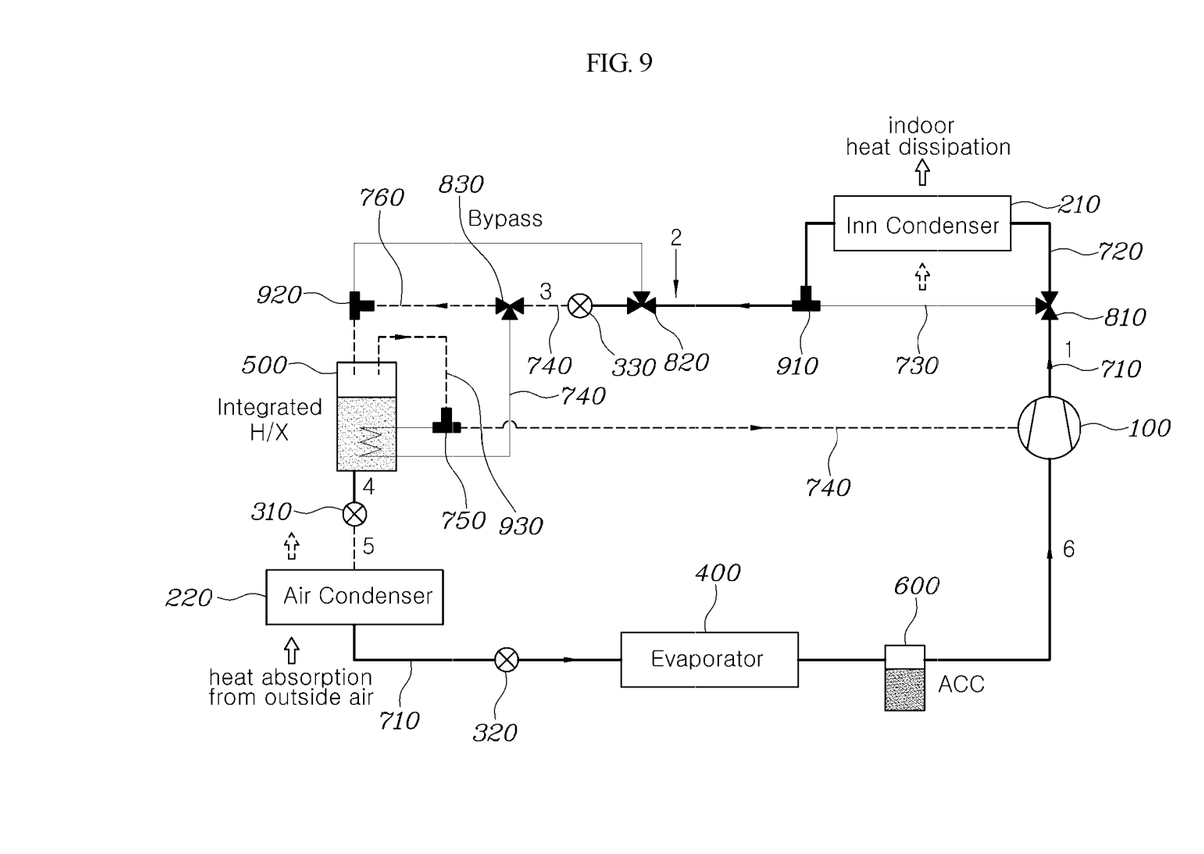
FIG. 9 is a circuit diagram showing the operation of the second gas injection heat pump mode in a thermal management system of gas injection type for a vehicle according to an embodiment of the present disclosure.
Figure 10:
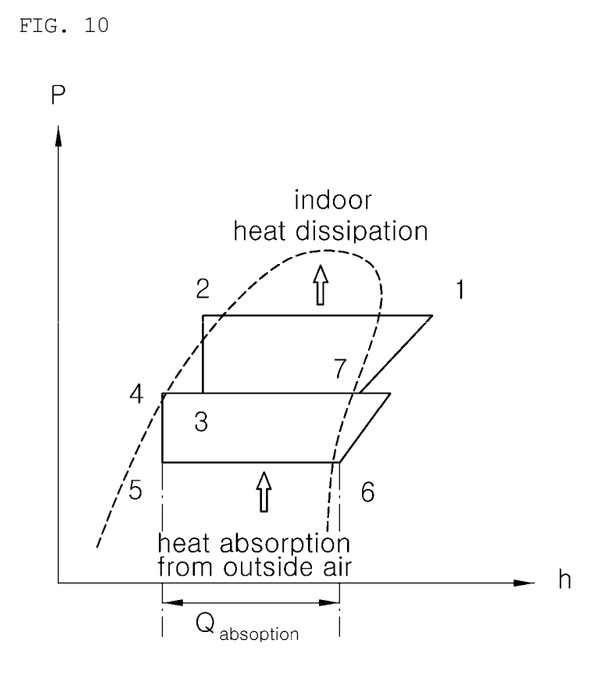
FIG. 10 is a P-h diagram showing the operation of the second gas injection heat pump mode in a thermal management system of gas injection type for a vehicle according to an embodiment of the present disclosure.

FIGS. 9 and 10 are a circuit diagram and a P-h diagram showing the operation of the second gas injection heat pump mode in a thermal management system of gas injection type for a vehicle according to an embodiment of the present disclosure.

In this case, both gas injection and heat absorption using the outside air may be performed.

In further detail, the compressor 100 discharges a high-temperature and high-pressure refrigerant which is utilized in the inner condenser 210 to dissipate heat, thereby heating the cabin. All of the refrigerant flowing through the inner condenser 210 is expanded by the third expansion valve 330 under the control of the second three-way valve 820. All of the expanded refrigerant is introduced into the integrated heat exchanger 500.

In the integrated heat exchanger 500, the gaseous refrigerant and the liquid refrigerant are separated. The gaseous refrigerant is directly supplied to the compressor 100 through the gas injection refrigerant line 740, whereas the liquid refrigerant additionally expands in the first expansion valve 310, and then absorbs heat from the outside air while passing through the air condenser 220. The refrigerant that has absorbed the heat is returned to the compressor 100 through the fully opened second expansion valve 320 and the evaporator 400.

Accordingly, both the refrigerant that has absorbed the heat of the outside air and the gaseous refrigerant are introduced into the compressor 100, so that the sufficient flow rate of refrigerant can be secured. Moreover, in this case, it is possible to additionally absorb the heat from the outside air in addition to securing the refrigerant flow rate through gas injection, representing a mode that can achieve high efficiency when the temperature of the outside air is higher than a certain level.

FIG. 10 shows the relevant P-h diagram, which shows the process of absorbing heat from outside air while additionally securing refrigerant through gas injection.

Although the present disclosure has been described with reference to the accompanying drawings and the above-described preferred embodiments, the present disclosure is not limited thereto, but is defined by the following claims. Accordingly, those of ordinary skill in the art can variously change and modify the present disclosure within the scope without departing from the spirit of the claims to be described later.

What is claimed is:

1. A thermal management system of gas injection type for a vehicle, the system comprising:

a main refrigerant line in which a compressor, an inner condenser, a first expansion valve, an air condenser, a second expansion valve, and an evaporator are provided to circulate a refrigerant;

an integrated heat exchanger that is provided between the inner condenser and the air condenser on the main refrigerant line, and allows heat exchange between a portion of refrigerant discharged from the compressor or the inner condenser and refrigerant which is an expanded version of the remaining refrigerant;

a gas injection refrigerant line branched from a rear end of the compressor or the inner condenser, and in which branched refrigerant passes through a third expansion valve and then is bypassed to the compressor through the integrated heat exchanger; and a controller that controls whether the compressor operates or not, and, by adjusting opening degrees of the first expansion valve, the second expansion valve, and the third expansion valve, controls whether the refrigerant flows or not and whether the refrigerant expands or not, wherein between the compressor and the inner condenser, a first branch line is provided in which the refrigerant discharged from the compressor joins, after bypassing the inner condenser, the refrigerant that has passed through the inner condenser, the gas injection refrigerant line is branched from the rear end of a point where the first branch line joins the main refrigerant line, a second branch line, in which the refrigerant expanded in the third expansion valve joins the refrigerant that has bypassed the third expansion valve, is provided at the rear end of the third expansion valve of the gas injection refrigerant line, and the integrated heat exchanger is provided with a third branch line that allows a gaseous refrigerant to be joined at a front end of the compressor of the gas injection refrigerant line.

2. The thermal management system of gas injection type for a vehicle of claim 1, wherein in the integrated heat exchanger, heat exchange takes place between a liquid refrigerant that is part of the refrigerant discharged from the compressor or inner condenser, and a gaseous refrigerant expanded in the third expansion valve, and the heat-exchanged gaseous refrigerant is separated and bypassed to the compressor.

3. The thermal management system of gas injection type for a vehicle of claim 1, wherein in a general heat pump mode, the controller circulates the refrigerant only through the main refrigerant line, and allows heat absorbed from outside air in the air condenser and heat generated when the refrigerant is compressed in the compressor to be dissipated in the inner condenser to indoor air.

4. The thermal management system of gas injection type for a vehicle of claim 3, wherein in the general heat pump mode, the controller operates the compressor so that the compressed refrigerant passes through the inner condenser and exchanges heat with the indoor air of a vehicle to dissipate heat, and adjusts the opening degree of the first expansion valve, so that the refrigerant heat-dissipated through the inner condenser expands while passing through the first expansion valve and exchanges heat with the outside air to absorb heat while passing through the air condenser.

5. The thermal management system of gas injection type for a vehicle of claim 4, wherein in the general heat pump mode, the controller fully opens the second expansion valve and fully closes the third expansion valve.

6. The thermal management system of gas injection type for a vehicle of claim 1, wherein in a general cooling mode, the controller circulates the refrigerant to the main refrigerant line while allowing the refrigerant compressed in the compressor to flow to a first branch line to bypass the inner condenser, and ensures that heat absorbed in the evaporator for indoor cooling and heat generated when the refrigerant is compressed in the compressor are dissipated in the air condenser.

7. The thermal management system of gas injection type for a vehicle of claim 6, wherein in the general cooling mode, the controller operates the compressor so that the compressed refrigerant passes through the air condenser and exchanges heat with outside air to dissipate heat, and adjusts the opening degree of the second expansion valve, so that the refrigerant condensed while passing through the air condenser expands while passing through the second expansion valve and exchanges heat with the outside air flowing into a vehicle to absorb heat while passing through the evaporator.

8. The thermal management system of gas injection type for a vehicle of claim 7, wherein in the general cooling mode, the controller fully opens the first expansion valve and fully closes the third expansion valve.

9. The thermal management system of gas injection type for a vehicle of claim 1, wherein in a first gas injection heat pump mode, the controller circulates the refrigerant to the main refrigerant line and the gas injection refrigerant line, but ensures a portion of the refrigerant that has passed through the inner condenser is subcooled in the integrated heat exchanger before circulating, while the remaining refrigerant expands and then is heat exchanged in the integrated heat exchanger before circulating to the compressor, and allows heat absorbed from outside air in the air condenser and heat generated when the refrigerant is compressed in the compressor to be dissipated in the inner condenser to indoor air.

10. The thermal management system of gas injection type for a vehicle of claim 9, wherein in the first gas injection heat pump mode, the controller operates the compressor so that the compressed refrigerant passes through the inner condenser and exchanges heat with indoor air of a vehicle to dissipate heat, adjusts an opening degree of the third expansion valve so that a portion of the refrigerant heat-dissipated through the inner condenser is subcooled while exchanging heat in the integrated heat exchanger, and the remaining refrigerant expands while passing through the third expansion valve and then exchanges heat to absorb heat in the integrated heat exchanger, and adjusts an opening degree of the first expansion valve so that the subcooled refrigerant in the integrated heat exchanger expands while passing through the first expansion valve and exchanges heat with the outside air to absorb heat while passing through the air condenser.

11. The thermal management system of gas injection type for a vehicle of claim 10, wherein in the first gas injection heat pump mode, the controller fully opens the second expansion valve.

12. The thermal management system of gas injection type for a vehicle of claim 1, wherein in a COP=1 heating mode, the controller circulates the refrigerant to the gas injection refrigerant line, but ensures a portion of the refrigerant that has passed through the inner condenser bypasses to the integrated heat exchanger, while the remaining refrigerant expands and then absorbs heat in the integrated heat exchanger before circulating to the compressor, and allows heat absorbed through heat exchange in the integrated heat exchanger and heat generated when the refrigerant is compressed in the compressor to be dissipated in the inner condenser to indoor air.

13. The thermal management system of gas injection type for a vehicle of claim 12, wherein in the COP=1 heating mode, the controller operates the compressor so that the compressed refrigerant passes through the inner condenser and exchanges heat with indoor air of a vehicle to dissipate heat, adjusts an opening degree of the third expansion valve so that a portion of the refrigerant heat-dissipated through the inner condenser is heat-dissipated while exchanging heat in the integrated heat exchanger, and the remaining refrigerant expands while passing through the third expansion valve and then exchanges heat to absorb heat in the integrated heat exchanger.

14. The thermal management system of gas injection type for a vehicle of claim 13, wherein in the COP=1 heating mode, the controller fully closes the first expansion valve and the second expansion valve.

15. The thermal management system of gas injection type for a vehicle of claim 1, wherein in a second gas injection heat pump mode, the controller circulates the refrigerant to the main refrigerant line and the gas injection refrigerant line, but ensures a portion of the refrigerant that has passed through the inner condenser expands and joins the remaining refrigerant, while ensuring the refrigerant is subcooled in the integrated heat exchanger before circulating a portion of the refrigerant to the compressor and the remaining refrigerant to the air condenser, and allows heat absorbed from outside air in the air condenser and heat generated when the refrigerant is compressed in the compressor to be dissipated in the inner condenser to indoor air.

16. The thermal management system of gas injection type for a vehicle of claim 15, wherein in the second gas injection heat pump mode, the controller operates the compressor so that the compressed refrigerant passes through the inner condenser and exchanges heat with indoor air of a vehicle to dissipate heat, adjusts an opening degree of the third expansion valve so that a portion of the refrigerant heat-dissipated through the inner condenser expands while passing through the third expansion valve and joins the remaining refrigerant, before the refrigerant is subcooled in the integrated heat exchanger, and adjusts an opening degree of the first expansion valve so that the refrigerant subcooled in the integrated heat exchanger expands while passing through the first expansion valve and exchanges heat with the outside air to absorb heat while passing through the air condenser.

17. The thermal management system of gas injection type for a vehicle of claim 16, wherein in the second gas injection heat pump mode, the controller fully closes the second expansion valve.

* * * * *